United States Patent [19]

Jendick

[11] Patent Number: 4,679,659
[45] Date of Patent: Jul. 14, 1987

[54] METHOD AND APPARATUS FOR LUBRICATING A MOVING CHAIN

[75] Inventor: Manfred Jendick, Recklinghausen, Fed. Rep. of Germany

[73] Assignee: GerroKaiser Dosenwerk GmbH & Co KG, Fed. Rep. of Germany

[21] Appl. No.: 875,503

[22] Filed: Jun. 18, 1986

Related U.S. Application Data

[63] Continuation of Ser. No. 671,696, Nov. 15, 1984, abandoned.

[30] Foreign Application Priority Data

Nov. 18, 1983 [DE] Fed. Rep. of Germany ....... 3341658

[51] Int. Cl.$^4$ ............................................ F16N 13/02
[52] U.S. Cl. .................... 184/15.2; 184/272; 417/273
[58] Field of Search .................... 184/15.1, 15.2, 7.4, 184/27.2; 474/91; 417/273

[56] References Cited

U.S. PATENT DOCUMENTS

| | | | |
|---|---|---|---|
| 1,900,745 | 3/1933 | Sutter | 184/27 A |
| 1,979,863 | 11/1934 | Carruthers | 417/273 |
| 2,022,620 | 11/1935 | Harper | 184/27 A |
| 2,561,785 | 7/1951 | Davis | 184/27 A |
| 3,073,415 | 1/1963 | Dutton et al. | 184/15.2 |
| 4,009,764 | 3/1977 | Hafner | 184/15.2 |
| 4,085,821 | 4/1978 | Kast et al. | 184/15.2 |

FOREIGN PATENT DOCUMENTS 4370 2/1972 Japan ................... 184/15.2

Primary Examiner—Leonard E. Smith
Attorney, Agent, or Firm—Toren, McGeady & Associates

[57] ABSTRACT

In the periodic lubrication of a circulating link chain conducted around chain guide wheels, irrespective of the chain speed a predetermined constant quantity of lubricant is supplied to each lubrication point on the chain in a time which continually changes with the chain speed. The lubricant is supplied by a series of lubricating piston pumps which are operated successively during each lubrication period in synchronism with the speed of the chain. The working stroke of each pump is the same and is effected by the displacement of a member having an inclined surface arranged to be engaged by one or more rotating governing cams carried by a driving shaft which is coupled to a shaft driven by one of the chain wheels. The driving shaft is coupled and uncoupled at the beginning and end of each lubrication period by means which counts the lubrication points of the chain passing a sensor and is thus also dependent on chain speed.

10 Claims, 5 Drawing Figures

METHOD AND APPARATUS FOR LUBRICATING A MOVING CHAIN

This is a continuation of application Ser. No. 671,696, filed Nov. 15, 1984, now abandoned.

BACKGROUND OF THE INVENTION

This invention relates to a method of, and an apparatus for, periodically lubricating the links of a circulating chain guided around chain wheels.

Chain lubricating devices are known comprising their own lubricating chain wheel which is placed and held by a frame in a position on the chain where a sufficiently high chain tension for driving the lubricating chain wheel exists, such as near one of the non-driven chain guide wheels. On each of the flat surfaces of the lubricating chain wheel, there is a ring having radially oriented oil outlet openings distributed around its entire circumference. The rings are each divided into eight oil chambers, and each chamber supplies four nozzles with lubricating oil. There is a piston for adjoining pairs of oil chambers, which thus operates eight nozzles, four on the left and four on the right side of the wheel.

The axle of the lubricating chain wheel is journalled on the side walls of the frame so that the chain wheel adopts an off-centre position to allow a sufficiently large space between the chain wheel and one of the side walls for a bush with connections for the hydraulic pipes which supply the oil distributor rings, and also a bush seating each oil piston and a cam actuating the piston via an abutment arm. The lubricating oil, supplied by gravity from a storage vessel above the lubricating apparatus via an inlet valve, is applied periodically onto the chain at preset time intervals.

The lubricating components mounted on the axle of the lubricating chain wheel driven by the circulating chain are at times subjected to large rotational forces which, at high chain speeds, leads to uncontrolled empty running of the lubricating oil ducts and the applicator nozzles. A pressure-stable oil column therefore cannot form in the feed system to the nozzles, although such a column is absolutely necessary if extremely small hydraulic piston strokes are required to react in a rapid sequence. Known lubricating devices also include a pneumatically driven pump and therefore require a compressed air source, which in many industrial situations is not available.

The periodic lubricating of a chain dependent, for example, upon a timing relay, frequently leads in the set time allowed to more than just one lubrication of some of the lubricating points on the chain and to overlubrication, which is particularly disadvantageous in the foodstuffs and packaging industries. Furthermore, every lubrication point (pin end) does not receive the same quantity of oil, which moreover should be distributed uniformly over the largest possible area of the chain pin, since inaccurate application beyond the necessary region reduces the lubrication gaps and thus increases the oil demand.

The task underlying the present invention is to avoid the foregoing disadvantages and to provide a method and apparatus for periodically lubricating a circulating chain with which it becomes possible to lubricate up to 10,000 lubrication points (chain pins) per minute in such a way that, with a considerably reduced oil consumption and independently of time, the chain links each receive the same quantity of oil only once per chain revolution and at each end of a pin only in the region of the chain pin between the side bars, which small quantity can be distributed, even at high chain speeds, over the largest possible area of the chain pin.

SUMMARY OF THE INVENTION

According to one aspect of the invention, we provide a method of periodically lubricating a circulating chain which is guided around chain wheels, in which the lubricant is supplied to a plurality of lubrication points on the chain by at least one lubricating piston pump such that, irrespective of the chain speed, a constant quantity of lubricant is supplied to each lubrication point in a time which varies with the chain speed, the operation of the lubricating piston pump (i.e. the duration of its injection stroke) preferably being positively synchronized with the movement of the circulating chain derived from one of the chain wheels.

By keeping constant the quantity of oil applied per injection stroke at all chain speeds, while varying the application time per injection stroke according to the chain speed, it is possible to prevent the ejected or supplied quantity of oil suddenly striking each lubrication point of the chain at slow chain speed and, forming a droplet. In contrast, the very small quantity of oil, typically from $0.007$ $cm^3$ to $0.014$ $cm^3$, delivered per injection stroke is distributed over a large area of the chain pin, which is of particular importance for the retention of the oil on the chain and can be achieved also at high chain speeds.

According to another aspect of the invention, apparatus suitable for carrying out the method comprises an axially movable rotary driving shaft, means for coupling the shaft to one of the chain wheels so that the shaft is rotated by the chain wheel, at least one governing cam which is rotated by the shaft at a speed related to the chain speed when the shaft is coupled to the chain wheel, and at least one lubricating piston pump having a deflecting cam with an inclined surface which is engaged by the governing cam during rotation of the shaft to deflect the deflecting cam and operate the pump.

Preferably there are ten similar lubricating piston pumps disposed adjacent one another around a semicircle so that they are operated in succession by the governing cam as the shaft rotates, and there are two governing cams which are rotated by the driving shaft and which are positioned so that when one is engaging the deflecting cam of the first lubricating pump the other governing cam is engaging the deflecting cam of the last lubricating pump. Alternative arrangements which are also suitable comprise four governing cams and five pumps, one cam and twenty pumps; or twenty cams and one pump. High pressure lubricating pumps permit very high operating frequencies but require, for example for a cycle rate of 4000 lubricating pulses per minute or more, a lubricating oil pressure of 2 bar in the pump supply lines, and such high rates naturally lead to increased mechanical wear and reduced quality of lubrication. By the use of, for example, ten high-pressure lubricating pumps operated one after another, 10,000 lubricating pulses per minute can easily be realized with each individual pump being operated at only 1000 cycles per minute.

The hydraulic system is not subjected to any rotational forces at all. The chain speed, derived from the chain wheel, is transmitted during each lubricating period to the driving shaft and hence to each governing cam which, when it meets the inclined surface of the deflecting cam of a lubricating pump, generates a linear movement of the lubricating pump piston from its own rotary movement. The width and slope of the inclined surface of the deflecting cam accurately determine the start and end of a lubrication pulse because it is only during movement of the pump piston towards the pump outlet caused by a governing cam that lubricating oil is ejected from the oil applicator nozzles served by the pump and applied to the lubrication points. The rotating governing cams assure synchronizing of the high-pressure lubricating pumps with one another and also with the points to be lubricated, and by making them adjustable in position radially with respect to the driving shaft it is possible to adjust the working stroke of each pump piston and thus the quantity of oil which is to be delivered to each lubricating point. Depending upon whether the radius of rotation of the governing cams is increased or decreased, the piston stroke and quantity of oil will change accordingly.

The deflecting cams of the lubricating pumps are preferably located in a guide ring which, on the one hand supports them in the rotational direction while guiding the radial movement, and on the other hand exactly limits the return stroke of each deflecting cam. The return stroke is preferably effected by a restoring spring which acts to reset the pump piston when the rotating governing cam no longer engages the inclined surface of the deflecting cam, and under the force of the restoring spring the deflecting cam is brought to bear with an abutment surface against the guide ring. This ensures that the deflecting cam is always returned to the same starting position and that a constant quantity of oil is delivered in each working stroke. The governing cams which operate the pump pistons via the deflecting cams are preferably mounted on a guide sleeve surrounding and keyed onto the driving shaft.

The coupling of the driving shaft, preferably with the driven chain wheel of the circulating chain, and thus the picking up and transmitting of the chain speed to the governing cams, is preferably effected by coupling means comprising a two-part claw coupling, the first part of which is keyed to the output shaft of a mitre gear arranged to be driven by the chain wheel, and the second part of which is firmly connected to the driving shaft and is engaged and disengaged from the first part by axial movement of the driving shaft. The claw coupling is disengaged in the periods between the lubricating cycles so that the driving shaft is not rotated and the lubrication pumps are therefore not operated. The output shaft of the mitre gear idles at the speed of the chain wheel during these inoperative periods.

The engaging and disengaging of the coupling may be effected by an actuating device which is arranged to move the driving shaft axially and which has an entraining stirrup engaging in a recess in an entraining sleeve disposed on the end of the driving shaft remote from the claw coupling. A suitable actuating device, depending upon the construction of the apparatus, may be a hand lever, a pneumatic or hydraulic actuating cylinder, or an electrically governed lifting magnet.

The lubricating apparatus may be firmly connected with the mitre gear, the driving shaft and its guide sleeve being mounted for rotation in a bearing disposed in a bearing housing which is connected firmly to a base plate through a centering plate, a pump carrier disc, and spacers between the centering plate, the pump carrier disc, and the base plate.

To prevent the lubricating oil continuing to flow after an injection stroke and smearing the chain in uncontrolled manner with oil, the lubricating pumps each possess a spring-loaded non-return valve in each of its inlet and outlet ports. The non-return valve in the high-pressure outlet port closes immediately after the working stroke of the pump piston and reliably prevents onward flow of the lubricating oil. During the return stroke of the pump piston by the restoring spring, a suction is created simultaneously with the closing of the outlet port valve, and the non-return valve in the inlet port opens so that the suction causes the cylinder to refill with lubricating oil ready for the next working stroke.

Preferably each lubricating pump has a pipeline leading from the pump outlet to a horizontal nozzle holder located above the chain, the pipelines being spaced apart in a row in the nozzle holder and each dividing equally below the holder into a pair of oil distributor pipes having oil applicator nozzles for delivering the oil to opposite sides of the chain. The quantity of oil delivered by the working stroke of each pump piston is thus divided equally by the halving of the corresponding pipeline cross-section into two distributor pipes, and is thus delivered by the oil applicator nozzles in equal quantities to the two lubricating positions on opposite sides of the chain, i.e. at the two ends of a pin.

The aimed application of the lubricating oil onto the chain sidebars of the pin sections may be improved by providing chain guides in the region of the oil applicator nozzles for positively guiding the chain beneath the nozzles. The optimum utilization of the quantity of oil delivered, by accurate application only onto the positions to be lubricated, enables the pauses between lubrication periods to be lengthened by a factor of several times.

Self-lubrication, and thus increased life, of the lubricating apparatus may be achieved if the lubricating apparatus, especially its moving parts, is mounted in a housing filled with oil.

Automatic operation of the chain lubricating apparatus may be realized by control means for initiating the engagement and disengagement of the coupling means at the beginning and end of each lubricating period, the control means comprising a sensor operative in association with the chain wheel to provide pulses representing the passage of chain lubricating points, and a pair of pulse counters responsive to the sensor to determine the duration of each engagement and disengagement of the coupling means. Preferably one of the pulse counters operates to cause the actuating device to engage the coupling means for a predetermined number, of pulses, and the other pulse counter operates alternately with the first counter to cause the actuating device to disengage the coupling means for a further predetermined number of pulses. Thus, by appropriate setting of the first or lubricating pulse counter, all lubrication points of the chain may be assured of receiving oil just once in each lubrication period, which may be one revolution of the chain. During a lubrication period the first counter counts down the pulses from the sensor from the preset input value to zero, and the second or pause counter does not receive any pulses. When zero is reached, the actuating apparatus is triggered to uncouple the driving shaft, and the pulses from the sensor are switched to the pause counter which proceeds to count downwards to zero from its preset value, which represents the length of time measured in chain revolutions before the next lubricating cycle is to commence. In this manner the chain lubrication is not strictly time-dependent, but is controlled by the effective circulations of the chain to be lubricated.

DESCRIPTION OF THE EMBODIMENTS

Figure 1:
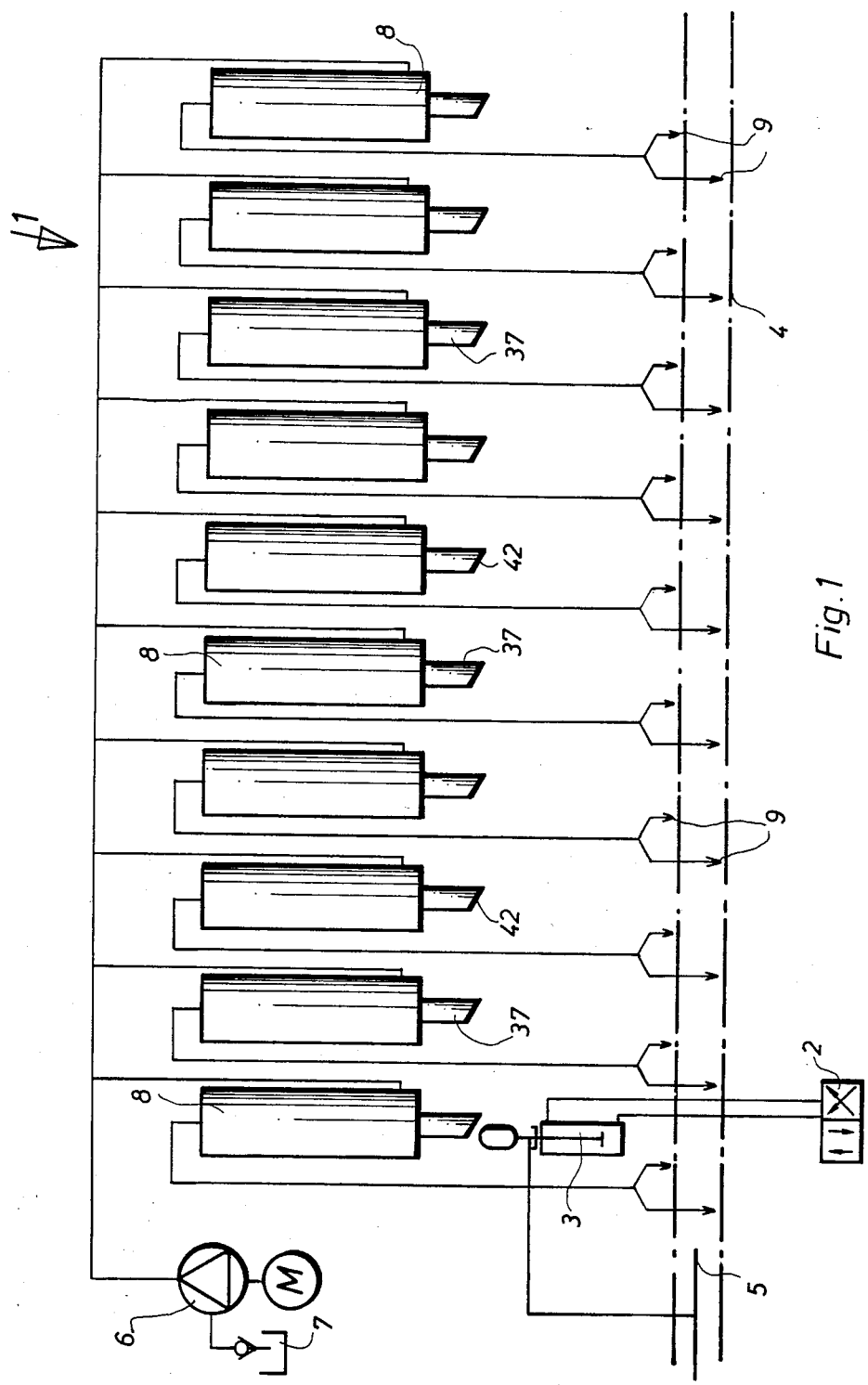
FIG. 1 shows a schematic block diagram of the chain lubricating system in accordance with the invention.

The chain lubricating apparatus, referenced generally at 1 in the drawings, may be governed as indicated in FIG. 1 by a multi-way valve 2 controlling an actuating apparatus 3 to trigger the lubrication as a function of the speed of the continually circulating chain 4 around the driving chain wheel 5. Thereupon, a hydraulic motor 6 supplies lubricating oil from an oil tank 7 to a series of individual high-pressure pumps 8 which are cam-actuated one after another to discharge the desired quantity of oil to the lubrication points of the chain 4 through oil applicator nozzles 9, as will be explained later in more detail.

The timing of the injection strokes of the pumps is effected via the chain 4 to be lubricated and its chain wheel 5, which is connected by toothed belts (not shown) and a mitre gear 12 (FIG. 2) to the chain lubricating apparatus 1. The mitre gear 12 possesses, for this purpose, at its output side a shaft 13 having a keyed-on half-coupling 14 which is engageable with a second half-coupling 15 carried by an axially movable driving shaft 17. The two half-couplings 14 and 15 constitute a claw coupling 16 for engaging and disengaging the driving shaft 17 with the mitre gear shaft 13 by appropriate axial movement of the driving shaft.

On the driving shaft 17, two keys 18 secure a cam carrier guide sleeve 19 carrying two governing cams 23 which are radially adjustably mounted on it by means of pins 22. A bearing 24 supports the guide sleeve 19 within a bearing sleeve having a flange 25 which is connected via a centering plate 26, spacers 27, a pump carrier disc 29, further spacers 28, and a baseplate 32, with the mitre gear 12.

Figure 2:
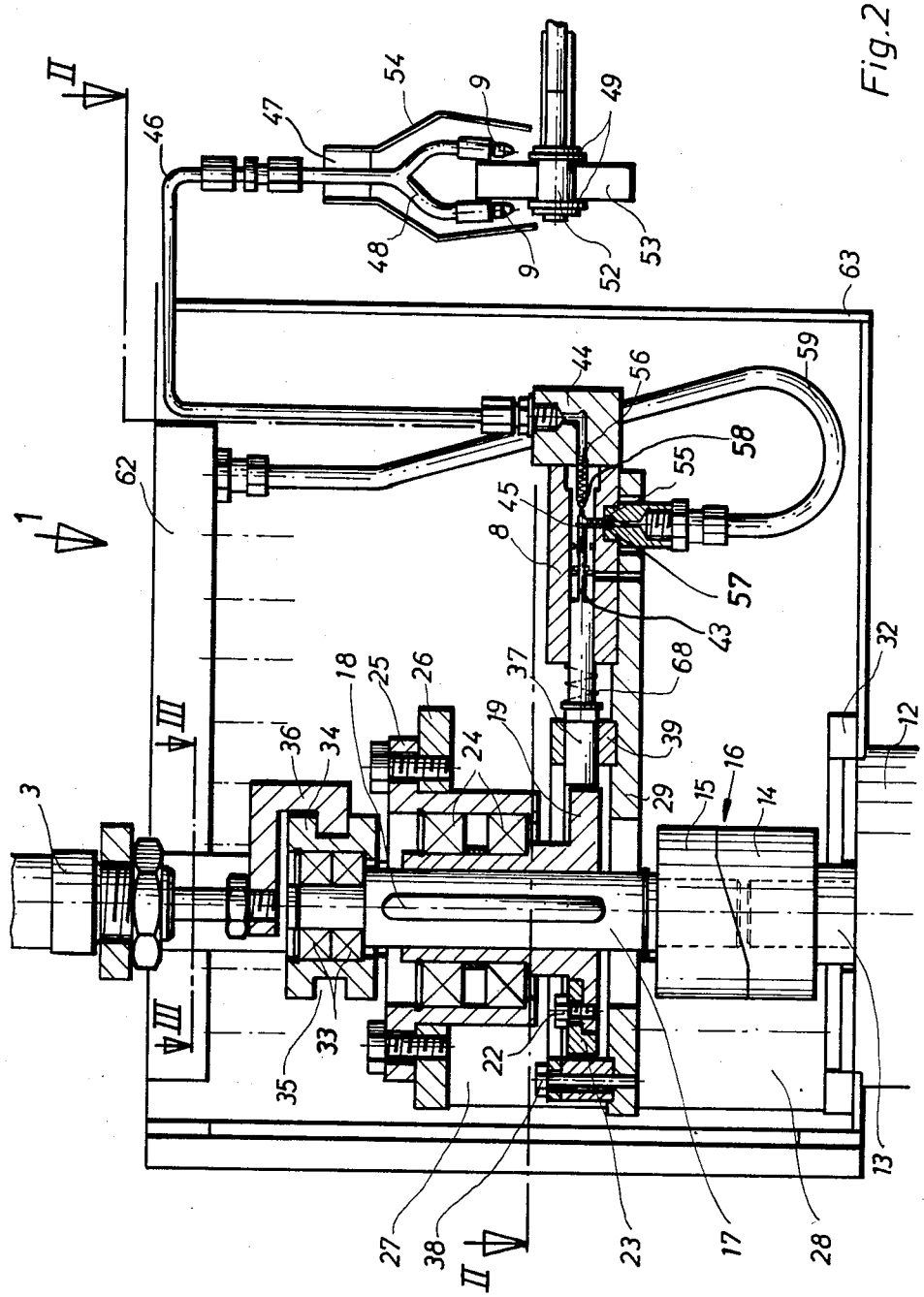
FIG. 2 is a part elevational, part sectional view of an actual example of chain lubricating apparatus in accordance with the invention.
Figure 4:
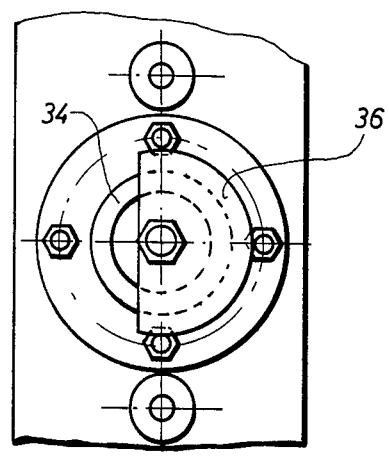
FIG. 4 is a partial plan view taken along the line III—III in FIG. 2.

At the end of the driving shaft 17 remote from the claw coupling 16, a bearing 33 carries an entraining sleeve 34 having a peripheral groove-like recess 35 into which an entraining stirrup 36 of the actuating apparatus 3 engages as shown in FIGS. 2 and 4. In this way the actuating apparatus is arranged to move the driving shaft 17 axially to engage and disengage the coupling 16 at the beginning and end of a lubricating operation.

Figure 3:
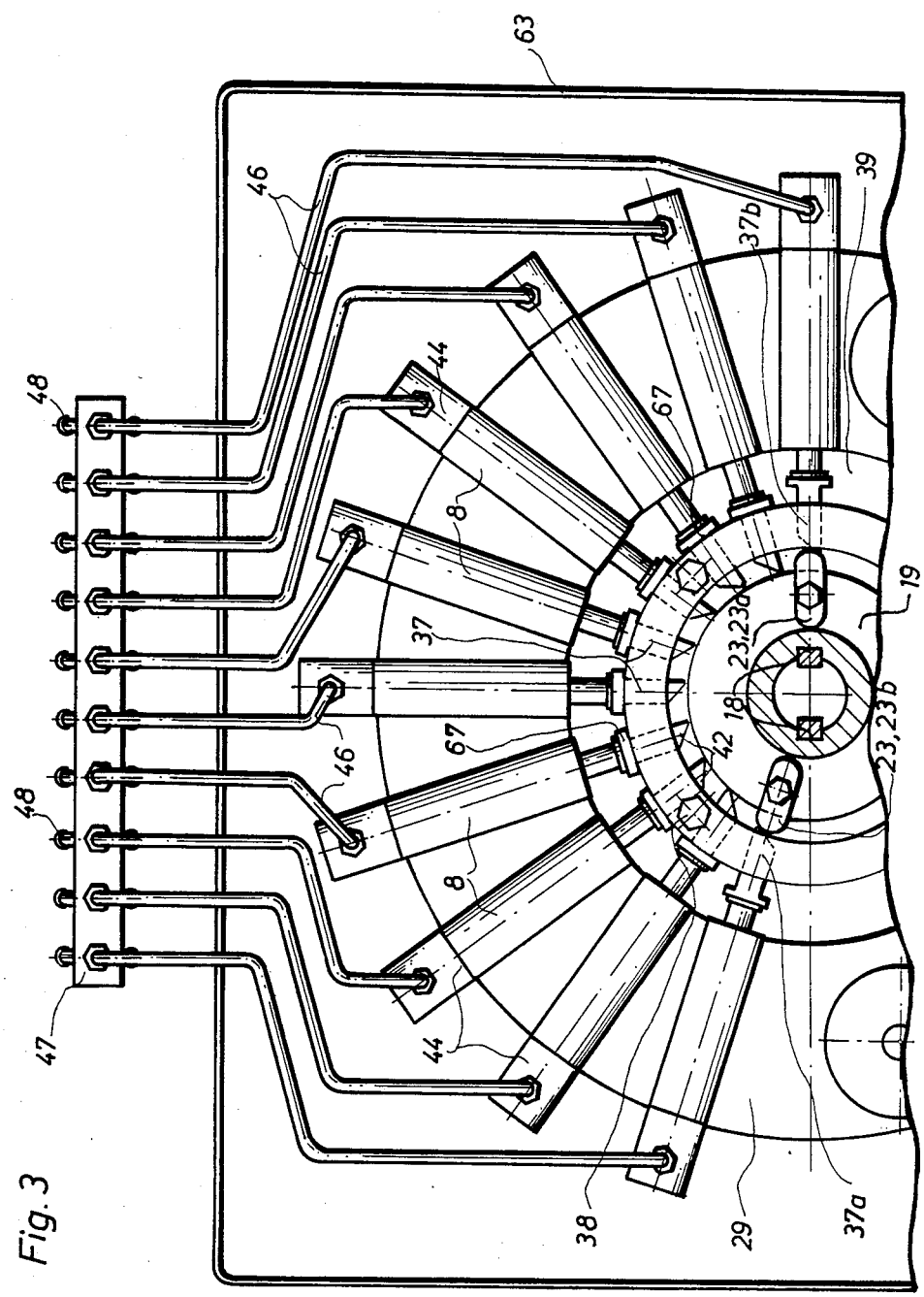
FIG. 3 is a part plan, part transverse sectional view of the apparatus taken along the line II—II in FIG. 2.

When the coupling 16 is engaged for lubricating the circulating chain 4, the governing cams 23 are rotated by the driving shaft 17 via the guide sleeve 19 and come one after another into contact with deflecting cams 37 of the high-pressure pumps 8, which are fixed spaced apart from one another in a half-circle on the pump carrier disc 29 (FIG. 3). The deflecting cams 37 extend through openings in a guide ring 39 which is fixed by means of bolts 38 on the pump carrier disc 29, and have inclined surfaces 42 positioned in the path of the governing cams 23. Engagement of the cams 23 with the inclined surfaces 42 during rotation of the cams 23 pushes the deflecting cams 37 radially outwards, converting the rotary movement of the cams 23 into linear movements which force the pistons 43 of the pumps 8 one after the other towards the pump head 44 to supply the oil contained in the pressure chamber 45 through the pipes 46 to the oil applicator nozzles 9. A nozzle holder 47, disposed in the lubricating region above the chain 4, secures the pipelines 46, in a row, and below the nozzle holder 47 each pipe 46 divides into a pair of oil distributor pipes 48 each having half the cross-section of the pipes 46 and an oil applicator nozzle 9 at its end. The two nozzles 9 are oriented to the left and right of the chain accurately above the lubrication points 49 on a chain pin 52. An additional chain guide 53 ensures the accurate alignment of the chain 4 beneath the nozzles 9, and the nozzles with the oil distributor pipes 48 can be encased within a protective metal housing 54.

Each pump 8 possesses, both in its suction inlet port 55 and in its high-pressure outlet port 56, a spring-loaded non-return or check valve 57, 58 respectively. The inlet ports 55 receive oil from an oil distributor 62 via flow lines 59, and the complete lubricating apparatus 1, especially its mechanically loaded parts, is housed together with the oil distributor 62 in an oil-filled housing 63.

Figure 5:
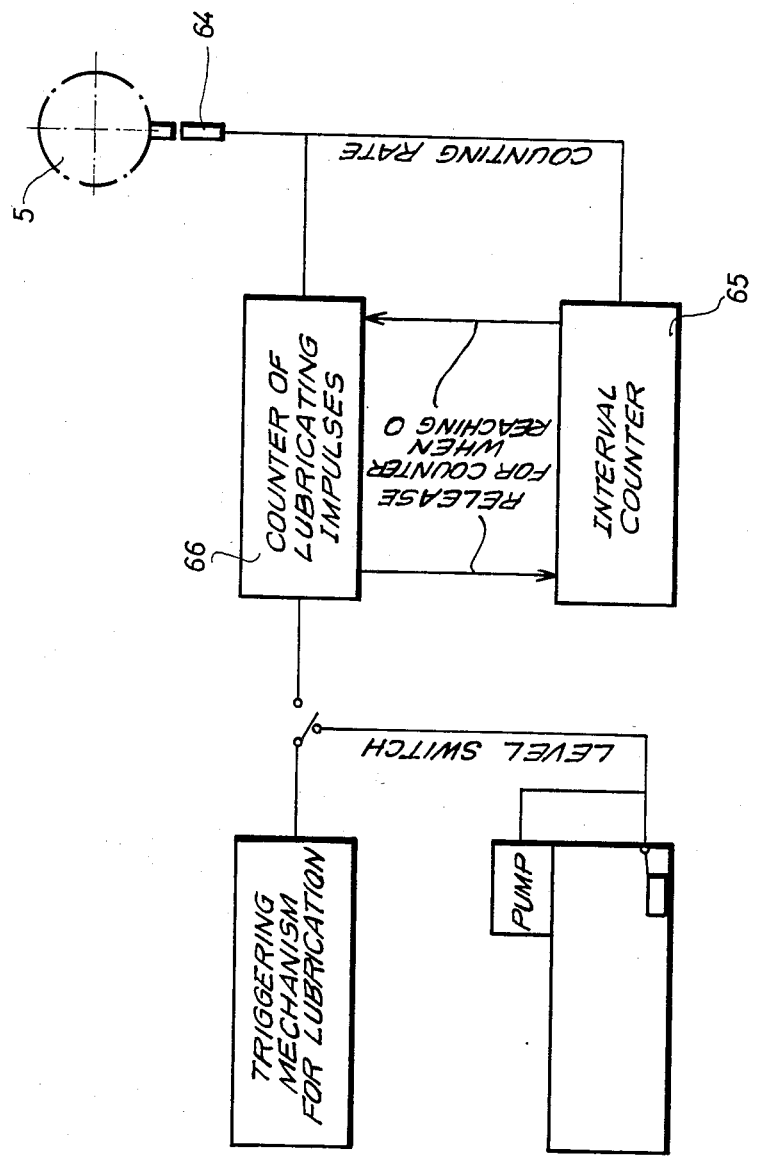
FIG. 5 shows a block diagram of an automatic control system for the chain lubricating apparatus.

Automatic control of the chain lubrication operation is illustrated in FIG. 5. A sensor 64 senses the lubrication points 49 passing over the chain wheel 5 and outputs pulses representing these points. In the pause between lubrication cycles the pulses from the sensor 64 are transmitted to a pause pulse counting device 65 which counts down to zero from a preset number of lubrication points representing the desired running period between lubrications. The pause counting device 65 then switches the pulses to a lubrication pulse counting device 66 and simultaneously triggers the actuating apparatus 3 to commence a lubrication cycle.

The actuating apparatus 3 couples the driving shaft 17 to the output shaft 13 of the mitre gear 12, whereupon the torque derived from the driving chain wheel 5 is transmitted without delay to the driving shaft 17 and the latter, together with the cam carrier guide sleeve 19 and the governing cams 23, rotates at the same speed as the chain. During the course of the rotation, the governing cams 23 successively meet the deflecting cams 37, which in their starting positions rest with a shoulder 67 against the guide ring 39. Consequently each commences its working stroke, which effects the injection stroke of the corresponding pump piston, from a position which is the same for all, and is returned to the starting position after the working stroke has finished by a restoring spring 68 acting on the piston.

The width and inclination of each deflecting cam 37 accurately determines the start and end of each injection stroke, the governing cam 23 moving the pump piston 43 to the right towards the pump head 44 during its movement across the inclined surface 42 of the deflecting cam 37 and thereby forcing the lubricating oil from the pressure chamber 45 to the nozzles 9. Immediately after the working stroke of the pump piston 43, the non-return valve 58 closes the high-pressure outlet 56 and prevents any further flow of the lubricating oil. The restoring spring 68 resets the deflecting cam 37 into its starting position, and as a result of the suction that occurs opens the non-return valve 57 of the inlet port 55 so that the pressure chamber 45 can simultaneously refill with oil via the flow line 59 from the oil distributor 62.

The chain is lubricated by the cam controlled operation of the pumps 8 until the lubrication counter device 66 has counted down to zero from its preset number of pulses. Thereupon the actuating apparatus 3 disconnects the triggering mechanism for the chain lubrication, i.e. the actuating apparatus 3 is operated to separate the coupling 16 by retracting the driving shaft 17 via the stirrup 36 engaging in the recess 35 of the entraining sleeve 34, and the lubricating apparatus comes to rest. When the triggering mechanism has been deactivated (see FIG. 5), the hydraulic motor or hydraulic pump 6 no longer supplies lubricating oil, and the pulses from the sensor 64 are switched back to the pause counter device 65 which must then count down to zero before the next lubrication cycle can begin.

I claim:

1. Apparatus for periodically applying a selected amount of a liquid lubricant onto a rapidly moving chain having a number of spaced lubrication points thereon, a driving chain wheel, said chain being guided by said driving chain wheel, a plurality of spaced apart lubricant applicator nozzle units each arranged to direct lubricant on to different said lubrication points on said chain, a plurality of cam-actuated piston pumps each arranged for supplying a lubricant to a different one of said units, an axially extending driving shaft having at least one governing cam thereon arranged for operating said lubricant pumps, wherein the improvement comprises:

(a) means for interengaging said driving shaft and said driving chain wheel so that the torque from said driving chain wheel is transmitted to said driving shaft whereby said driving shaft is driven by said chain wheel at the same speed as said chain, (b) said piston pumps are arranged stationary and disposed in a semi-circular arrangement in angularly spaced relation in a single radial plane extending transversely of the axial direction of said driving shaft, and said at least one governing cam projects radially outwardly from said driving shaft and rotates in a circle moving past the stationary said piston pumps, said piston pumps comprising a first said piston pump, a last said piston pump and a number of intermediate said piston pumps located between the first and the last said piston pumps, (c) an oil distributor, (d) each said piston pump has a pump head, a pressure chamber within said pump head, said pressure chamber has a first end and a second end with an inlet intermediate the ends thereof for receiving the lubricant from said oil distributor and an outlet at the first end thereof for directing the lubricant to the associated said nozzle unit, an axially extending piston extending into the second end of said pressure chamber and being axially displaceable therein, said piston having one end located outside said pressure chamber and a deflecting cam located on said one end of said piston, means for displacing said piston away from the first end of said pressure chamber, said governing cam arranged to contact said deflecting cam on said piston and to displace said piston toward the first end of said pressure chamber to open said first check valve for discharging lubricant and when said governing cam releases said deflecting cam said displacing means returns said piston toward the second end of said chamber establishing a suction within said chamber for opening said second pressure valve and filling the pressure chamber with the selected amount of liquid lubricant whereby said second check valve closes when the filling operation is completed for maintaining the selected quantity of lubricant within said pressure chamber until said piston is again displaced by the cooperating action of said governing cam and deflecting cam, and (e) said at least one governing cam comprises a first said governing cam and a second said governing cam angularly offset relative to one another around said driving shaft with the spacing therebetween corresponding to the spacing between the first and the last said piston pumps, so that during rotation of said driving shaft the first said governing cam contacts said deflecting cam of the first said piston pump and the second said governing cam contacts the deflecting cam of the last said piston pump.

2. Apparatus as claimed in claim 1, including a cam carrier guide sleeve surrounding and keyed onto said driving shaft, and means mounting said governing cams on said guide sleeve.

3. Apparatus as claimed in claim 2, wherein said means mounting said governing cams on said guide sleeve permits adjustment of said governing cam radially with respect to said driving shaft.

4. Apparatus as claimed in claim 1, including a guide ring for said deflecting cams of said lubricating piston pumps.

5. Apparatus as claimed in claim 1, including control means for initiating the engagement and disengagement of said coupling means at the beginning and end of each lubricating period, said control means comprising a sensor operative in association with said driving chain wheel to provide pulses representing the passage of chain lubricating points, and a pair of pulse counters responsive to said sensor to determine the duration of each engagement and disengagement of said coupling means.

6. Apparatus as claimed in claim 1, wherein there is a horizontal nozzle holder located above said chain, each of said lubricating pumps having a pipeline leading from said outlet to said nozzle holder, said piplines being spaced apart in a row in said nozzle holder, and each of said pipelines dividing equally below said nozzle holder into a pair of oil distributor pipes each provided with one said applicator nozzles for delivering oil to opposite sides of said chain.

7. Apparatus as claimed in claim 6, including chain guides in the region of said oil applicator nozzles.

8. Apparatus as claimed in claim 1, wherein said interengaging means comprises a two-part claw coupling, said claw coupling having a first part keyed to an output shaft of a mitre gear adapted to be driven by said driving chain wheel, and a second part firmly connected to said driving shaft, said first and second claw coupling parts being engaged and disengaged from each other by axial movement of said driving shaft.

9. Apparatus as claimed in claim 8, including an entraining sleeve disposed at the end of said driving shaft remote from said claw coupling, and an actuating device for moving said driving shaft axially to engage and disengage said coupling, said entraining sleeve having a peripheral recess, and said actuating device having an entraining stirrup which engages in said recess.

10. Apparatus as claimed in claim 9, including control means for initiating the engagement and disengagement of said coupling means at the beginning and end of each lubricating period, said control means comprising a sensor operative in association with said driving chain wheel to provide pulses representing the passage of chain lubricating points, and a pair of pulse counters responsive to said sensor, one of said pulse counters operating to cause said actuating device to engage said coupling means for a predetermined number of pulses, and the other of said pulse counters operating alternately with said first pulse counter to cause said actuating device to disengage said coupling means for a further predetermined number of pulses.

* * * * *